May 1, 1962  W. I. HERRING ETAL  3,032,124
HILLING SWEEP
Filed July 25, 1958
FIG. 1
FIG. 6
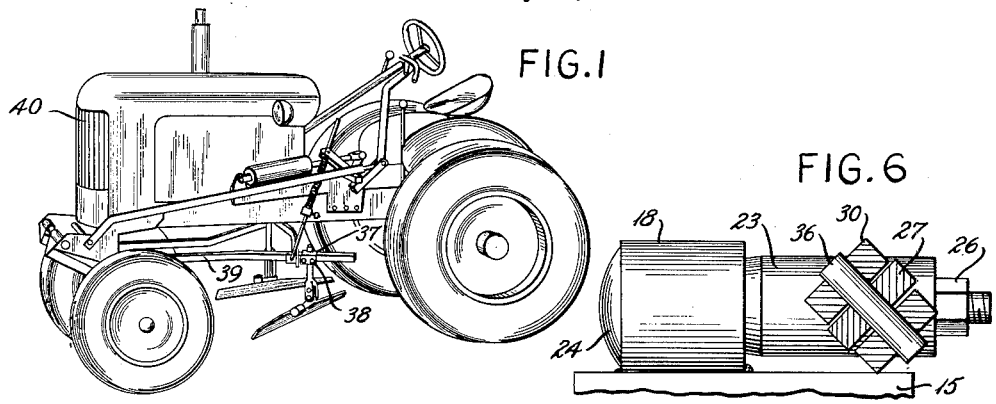
FIG. 4
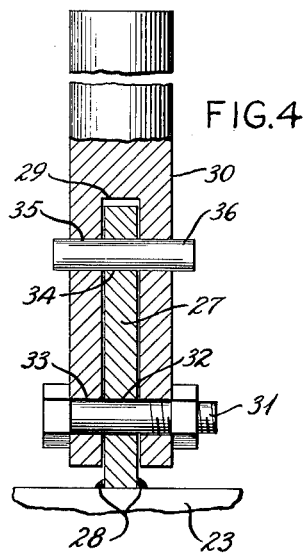
FIG. 2
FIG. 3
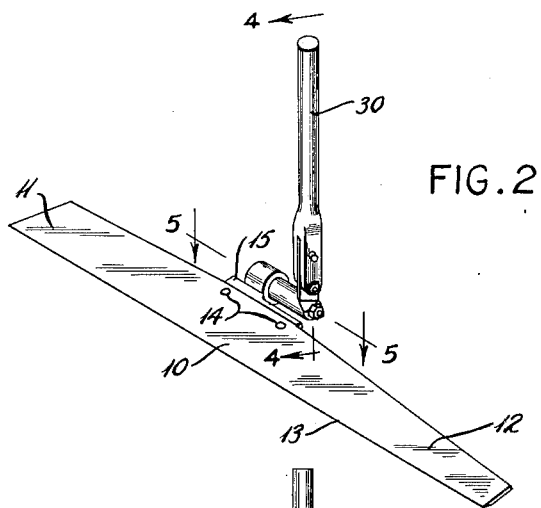
FIG. 5
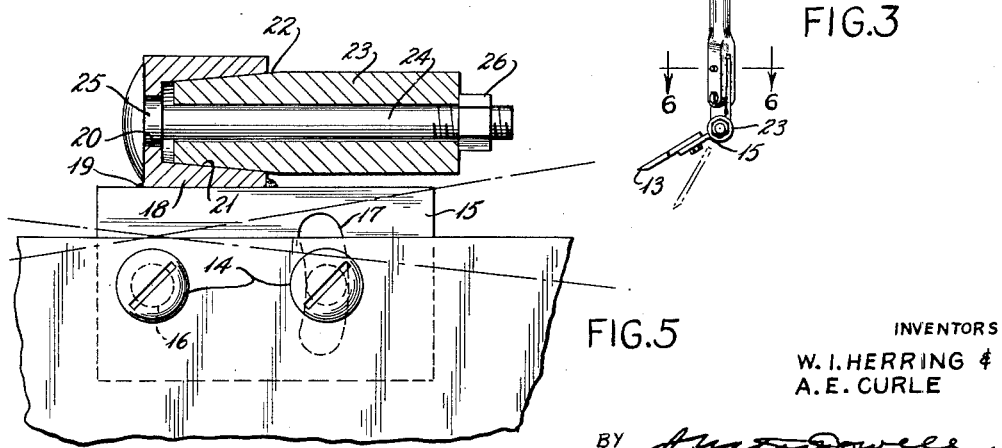
INVENTORS
W. I. HERRING &
A. E. CURLE
BY *H. Yates Dowell*
ATTORNEY 3,032,124
HILLING SWEEP
William I. Herring and Archie E. Curle, Kinston, N.C., assignors to Herring-Curle Tractor Company, Kinston, N.C.
Filed July 25, 1958, Ser. No. 750,954
2 Claims. (Cl. 172—642)

This invention relates to the cultivation of the soil, to the manner of such cultivation and to the equipment employed, and more particularly to the equipment employed in the cultivation of row crops such as cotton, corn, tobacco and the like.

The invention relates specifically to cultivators which may be attached to a tractor either for single or gang operation in the moving of the earth along a row to increase the mound of earth in the row or to move a portion of the earth with any accompanying grass or other growth.

Cultivator equipment has been subject to criticism or unsatisfactory for a number of reasons including its cost, complexity and cumbersomeness, and difficulty of use as well as damage to growing plants.

It is an object of the invention to overcome the difficulties enumerated and to provide a relatively simple plow or cultivator of few and readily available parts, which can be easily attached to or removed from a tractor, which can be employed to pull dirt under the leaves of growing plants without damaging the same, to put such dirt in high beds to protect in both wet and dry weather or to change the setting of the cultivator to form a hoeing or barring off operation thereby to remove dirt with or without grass or other growth as well as a cultivator which can be used with row crops or various kinds and with various soils.

One object of the invention is to provide a hilling sweep with simple means mounting the blades so that they may be easily attached to the cultivator bars for vertical movement therewith so that they can rotate about a vertical pivot, about a horizontal pivot, and be adjusted about a further pivot that is substantially perpendicular to the horizontal pivot to facilitate disposition of the blades in the desired position.

Another object of the invention is to provide mounting means for a cultivator blade of simple yet strong construction, including a hinge composed of relatively strong receiving and received portions relatively rotatable but capable of being secured in adjusted fixed relation, as well as a frangible element to yield in excessive pressure.

Other objects and advantages of the invention will be apparent from the following description taken in conjunction with the accompanying drawing wherein:

FIG. 1 is a perspective illustrating one application of the invention;

FIG. 2, an enlarged perspective of one of the cultivator blades in its mounting;

FIG. 3, an end elevation of the cultivator blade of FIG. 2;

FIG. 4, an enlarged fragmentary section on the line 4—4 of FIG. 2;

FIG. 5, an enlarged fragmentary detailed section on the line 5—5 of FIG. 2; and

FIG. 6, an enlarged fragmentary detailed section on the line 6—6 of FIG. 3.

Briefly stated the hilling sweep of the present invention comprises a pair of cultivator blades joined by a hinge connection to a supporting post, such hinge connection including adjustable frusto-conical engaging portions adapted to be secured with an axial bolt to hold them in fixed adjusted relation and with an upstanding arm attached to one of said hinge members and received between the bifurcated end of the supporting post by means of a couple of spaced pins, one of which is frangible so that when the excess pressure is encountered the frangible pin will break to permit the plow to pass an obstruction, the other member of the hinge being fastened to the blade by a couple of pins by the hinge having an arcuate slot to permit horizontal swinging adjustment of the blades.

With continued reference to the drawing the present invention is a hilling sweep having a pair of right and left hand long narrow blades. The right hand blade 10 has a tapered short end 11 and a longer end portion 12 tapering to a slightly reduced width at its extreme end, and the blade having a cutting edge 13. The blades of the pair are right and left hand, the right hand blade being illustrated and described in FIGS. 2 to 6, it being understood that the left hand blade is similar except that it is oppositely formed.

The blade is mounted by means of a pair of screws 14 engaging one side of a hinge 15 with such having a pair of openings 16 and 17, the latter being in the form of an arcuate slot 17 so that when the screws are loosened, the blade 10 may swing around the opening 16 to vary the angle of the axis of the blade relative to its support.

The hinge member 15 is provided with a socket or cup 18 which may be formed separately if desired and secured thereto by welding 19, such socket or cup member having an opening 20 in its bottom and a frusto-conical socket 21 adapted to receive the tapered extremity 22 of a hinge sleeve 23. The socket 18 and hinge sleeve 23 are adapted to be fastened in adjusted fixed relation by means of a carriage bolt 24, the socket having an opening 20 of a configuration to receive the square shank 25 of the carriage bolt 24 when the nut 26 is tight. Since the carriage bolt 24 and hinge sleeve 23 are supported in substantially horizontal position the blade can swing about such substantially horizontal axis.

To the side of the sleeve 23 is attached the end of a supporting arm 27, such arm being formed separately if desired from the sleeve and secured thereto by welds 28 or it may be attached in any other desired manner. The supporting arm 27 is mounted on the sleeve 23 at an angle to the longitudinal axis of such sleeve so that the supporting arm 27 is disposed generally parallel to the direction of travel of the tractor on which it is supported. The arm 27 extends upwardly and is received within the bifurcation 29 of a supporting post 30, being connected thereto by means of a bolt and nut 31, such bolt extending through an opening 32 in the arm 27 and through similar openings 33 in the spaced prongs of the post 30. The arm 27 is provided with an opening 34 and the spaced sides of the post are provided with openings 35 in which a frangible pin or peg 36 of wood or other material is adapted to be disposed to maintain the arm 27 and post 30 in fixed upright relation until an obstruction is encountered whereupon the pin or peg 36 will be subjected to excess stress and broken and the blade allowed to yield and pass the obstruction.

The post 30 is adapted to be secured by a conventional U-clamp 37 and bolts 38 to a cultivator bar 39 connected to a tractor 40, such bar being mounted in a manner to have its rear end raised and lowered hydraulically or in any other manner, there being right and left hand cultivator bars on which the right and left hand cooperating sides of the hilling sweep are mounted.

It will be apparent from the foregoing that the opposed blades of the hilling sweep may be raised and lowered as well as rotated, and the post 30 can be rotated in its mounting 37. They can be swung about the substantially horizontal axis of the sleeve 23 as a pivot and they may be adjusted edgewise with regard to the hinge plate 15 on which they are mounted by loosening the screws 14, thereby providing maximum adjustment of the blades of the sleeve and making them particularly useful in the cultivation of growing crops of cotton, corn, tobacco and other row crops. Due to its particular construction the sweep of the present invention can be used to pull dirt beneath the leaves of plants without damaging the same and putting the plants in a high bed to hold moisture during dry weather and to exclude moisture during wet weather thereby to protect the plants at all times. Also, the interfitting adjustable locking joint is such that it is strong and provides substantial surface contact between the tapered interfitting portions of the hinge by which the blades are carried although like the remainder of the device of simple construction and positive in action. The support arm 27 is located generally parallel to the direction of travel of the tractor so that when an obstruction is encountered the amount of side friction on the bifurcated supporting post will be minimized.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A hilling sweep comprising relative long, narrow right-hand and left-hand blades, mounting means disposed centrally of each blade along the upper surface thereof, said mounting means including a hinge plate having a pivot and a radial slot, fastening means received within the slot for permitting partial rotation of said blade substantially in the plane of said hinge plate, said hinge plate being connected along one side to a socket hinge member, the exterior of said socket being substantially cylindrical about the longitudinal axis thereof and the interior providing a substantially frusto-conical cup, an interfitting tapered sleeve for cooperative engagement with the frusto-conical cup of said socket, means for maintaining said socket and said sleeve in adjusted relation, a supporting arm mounted on said sleeve at an angle to the longitudinal axis thereof and disposed generally parallel to the direction of travel of said blades, a supporting post for each blade having a bifurcated end in which said arm is disposed, a pair of pins extending through said arm and the bifurcated end of said post and disposed substantially normal to the direction of travel of said blades, one of said pins being frangible so that it will break when subjected to excessive stress, and means for attaching said posts to the cultivator bar of a tractor.

2. A hilling sweep comprising relatively long narrow right and left-hand blades, mounting means disposed centrally of each blade adjacent to the upper surface thereof, said mounting means including a hinge plate and interfitting socket and sleeve members, the exterior of said socket member being substantially cylindrical along the longitudinal axis thereof and the interior providing a frusto-conical cup, said hinge plate being connected along one side to the cylindrical exterior of said socket member, said sleeve member having one end tapered for cooperative engagement with said frusto-conical cup, means for maintaining said socket and said sleeve in adjusted relation, a supporting arm mounted on said sleeve member remote from said tapered end and disposed at an angle to the longitudinal axis thereof, a supporting post for each blade having a bifurcated end for the reception of said arm, a pair of pins extending through said arm and the bifurcated end of said post and disposed substantially normal to the direction of travel of said blades, one of said pins being frangible whereby when said blade is subjected to excessive stress, the force will be applied directly to said frangible pin without binding and cause the pin to fracture and relieve the stress on the blade, and means for attaching said posts to the cultivator bar of a tractor.

References Cited in the file of this patent

UNITED STATES PATENTS

| | | |
|---|---|---|
| 280,021 | Ennis | June 26, 1883 |
| 534,222 | Knapp | Feb. 12, 1895 |
| 695,178 | Solomon | Mar. 11, 1902 |
| 816,851 | Eddy | Apr. 3, 1906 |
| 979,817 | Allbee | Dec. 27, 1910 |
| 1,654,765 | Troyer | Jan. 3, 1928 |
| 1,691,292 | Kyrklund | Nov. 13, 1928 |
| 1,799,519 | Laube | Apr. 7, 1931 |
| 2,191,929 | Strandlund | Feb. 27, 1940 |